US011902211B2

(12) United States Patent
Park

(10) Patent No.: US 11,902,211 B2
(45) Date of Patent: *Feb. 13, 2024

(54) APPARATUS AND METHOD FOR PERFORMING HYBRID AUTOMATIC REPEAT REQUEST OPERATION IN WIRELESS COMMUNICATION SYSTEM SUPPORTING CARRIER AGGREGATION

(71) Applicant: Innovative Technology Lab Co., Ltd., Seoul (KR)

(72) Inventor: Dong Hyun Park, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 336 days.

This patent is subject to a terminal disclaimer.

(21) Appl. No.: 17/329,152

(22) Filed: May 25, 2021

(65) Prior Publication Data
US 2021/0281379 A1    Sep. 9, 2021

Related U.S. Application Data

(63) Continuation of application No. 16/525,292, filed on Jul. 29, 2019, now Pat. No. 11,050,542, which is a
(Continued)

(30) Foreign Application Priority Data

Nov. 6, 2015 (KR) .................. 10-2015-0156038

(51) Int. Cl.
*H04L 5/00* (2006.01)
*H04W 72/23* (2023.01)
(Continued)

(52) U.S. Cl.
CPC ......... *H04L 5/0055* (2013.01); *H04B 7/0413* (2013.01); *H04L 1/1812* (2013.01); *H04W 72/23* (2023.01)

(58) Field of Classification Search
CPC ....... H04B 7/0413; H04L 1/16; H04L 1/1812; H04L 1/1861; H04L 5/0055;
(Continued)

(56) References Cited

U.S. PATENT DOCUMENTS 10,404,438 B2 * 9/2019 Park ..................... H04B 7/0413
11,050,542 B2 * 6/2021 Park ..................... H04B 7/0413
(Continued)

OTHER PUBLICATIONS

International Search Report for International Patent Application No. PCT/KR2016/012642, dated Feb. 15, 2017.
(Continued)

*Primary Examiner* — Joseph E Avellino
*Assistant Examiner* — Mon Cheri S Davenport

(57) ABSTRACT

Provided is a method of performing HARQ by a UE in a wireless communication system that supports carrier aggregation (CA). The method includes: receiving, from an evolved nodeB (eNB), a downlink grant on a first Physical Downlink Control Channel (PDCCH), the downlink grant including an accumulated downlink assignment indicator (A-DAI) field and a total DAI (T-DAI) field; receiving a first PDSCH indicated by the first PDCCH, the first PDSCH being transmitted from the eNB; receiving, from the eNB, an uplink grant on a second PDCCH, the uplink grant indicating a transmission of a Physical Uplink Shared Channel (PUSCH); determining a size of a HARQ-ACK codebook to which a HARQ-ACK with respect to the first PDSCH is to be mapped, based on the A-DAI and the T-DAI; and transmitting, to the eNB, the HARQ-ACK with respect to the first PDSCH on the PUSCH.

19 Claims, 14 Drawing Sheets

Related U.S. Application Data continuation of application No. 15/344,436, filed on Nov. 4, 2016, now Pat. No. 10,404,438.

(51) Int. Cl.
  *H04B 7/0413* (2017.01)
  *H04L 1/1812* (2023.01)

(58) Field of Classification Search
  CPC .. H04L 1/1896; H04L 5/0048; H04W 72/042; H04W 72/0406; H04W 72/1278; H04W 74/0808
  See application file for complete search history.

(56) References Cited

U.S. PATENT DOCUMENTS

| | | | |
|---|---|---|---|
| 2012/0039280 A1 | 2/2012 | Chen et al. | |
| 2013/0242816 A1 | 9/2013 | He et al. | |
| 2013/0279441 A1 | 10/2013 | Lee et al. | |
| 2015/0236824 A1* | 8/2015 | Lei | H04L 5/14 370/280 |

OTHER PUBLICATIONS

Written Opinion for International Patent Application No. PCT/KR2016/012642, dated Feb. 15, 2017.

"3rd Generation Partnership Project; Technical Specification Group Radio Access Network; Evolved Universal Terrestrial Radio Access (E-UTRA); Multiplexing and channel coding (Release 12)," 3GPP TS 36.212 V12.6.0, Sep. 2015, pp. 1-95, 3GPP Organizational Partners.

"3rd Generation Partnership Project; Technical Specification Group Radio Access Network; Evolved Universal Terrestrial Radio Access (E-UTRA); Physical layer procedures (Release 12)," 3GPP TS 36.213 V12.7.0, Sep. 2015, pp. 1-234, 3GPP Organizational Partners.

Huawei et al., "HARQ-ACK Codebook determination for carrier aggregation enhancement beyond 5 carriers", R1-153771, 3GPP TSG-RAN WG1 Meeting #82, Beifing, China, Aug. 24-28, 2015, pp. 1-7, 3GPP.

LG Electronics, "HARQ-ACK payload adaptation for Rel-13 CA", R1-155376, 3GPP TSG-RAN WG1 Meeting #82bis, Malmo, Sweden, Oct. 5-9, 2015, pp. 1-8, 3GPP.

Fujitsu, "Review of proposals for HARQ-ACK codebook determination", R1-155153, 3GPP TSG-RAN WG1 Meeting #82bis, Malmo, Sweden, Oct. 5-9, 2015, pp. 1-18, 3GPP.

* cited by examiner

FIG. 1A

| CC index | DL assignments (A_DAI, T_DAI) |
|---|---|
| 0 | (1, 5) |
| 1 | |
| 2 | (2, 5) |
| 3 | |
| 4 | (3, 5) |
| 5 | (4, 5) |
| 6 | |
| 7 | |
| 8 | (5, 5) |
| 9 | |
| 10 | |
| 11 | |

CC domain

FIG. 1B

| CC index | DL assignments (A_DAI, T_DAI) | | | |
|---|---|---|---|---|
| | DL Subframe#0 | DL Subframe#1 | DL Subframe#2 | DL Subframe#3 |
| 0 | (1, 5) | | | |
| 1 | | (6, 8) | | (13, 16) |
| 2 | (2, 5) | | | |
| 3 | | (7, 8) | (9, 12) | (14, 16) |
| 4 | (3, 5) | | (10, 12) | |
| 5 | (4, 5) | | | |
| 6 | | | (11, 12) | |
| 7 | | | | |
| 8 | (5, 5) | (8, 8) | | (15, 16) |
| 9 | | | | |
| 10 | | | (12, 12) | (16, 16) |
| 11 | | | | |

FIG. 1C

| CC index | DL assignments (A_DAI, T_DAI) |
|---|---|
| 0 | (2, 7) |
| 1 | |
| 2 | (4, 7) |
| 3 | |
| 4 | (5, 7) |
| 5 | (6, 7) |
| 6 | |
| 7 | |
| 8 | (7, 7) |
| 9 | |
| 10 | |
| 11 | |

CC domain

FIG. 1D

| CC index | DL assignments (A_DAI, T_DAI) | | | |
|---|---|---|---|---|
| | DL Subframe#0 | DL Subframe#1 | DL Subframe#2 | DL Subframe#3 |
| 0 | (2, 6) | | | |
| 1 | | (8, 10) | | (16, 19) |
| 2 | (3, 6) | | | |
| 3 | | (9, 10) | (11, 14) | (17, 19) |
| 4 | (4, 6) | | | |
| 5 | (5, 6) | | (12, 14) | |
| 6 | | | | |
| 7 | | | (13, 14) | |
| 8 | (6, 6) | (10, 10) | | (18, 19) |
| 9 | | | | |
| 10 | | | | (19, 19) |
| 11 | | | (14, 14) | |

FIG. 1E

| CC index | DL assignments (A_DAI, T_DAI) | | | |
|---|---|---|---|---|
| | DL Subframe#0 | DL Subframe#1 | DL Subframe#2 | DL Subframe#3 |
| 0 | (1, 16) | | | |
| 1 | | (6, 16) | | (13, 16) |
| 2 | (2, 16) | | | |
| 3 | (3, 16) | (7, 16) | (9, 16) | (14, 16) |
| 4 | (4, 16) | | (10, 16) | |
| 5 | (5, 16) | (8, 16) | (11, 16) | (15, 16) |
| 6 | | | | |
| 7 | | | | |
| 8 | | | (12, 16) | (16, 16) |
| 9 | | | | |
| 10 | | | | |
| 11 | | | | |

CC domain ← → Time domain

FIG. 1F

| CC index | DL assignments (A_DAI, T_DAI) | | | |
|---|---|---|---|---|
| | DL Subframe#0 | DL Subframe#1 | DL Subframe#2 | DL Subframe#3 |
| 0 | (2, 19) | | | |
| 1 | | (8, 19) | | (16, 19) |
| 2 | (3, 19) | | | |
| 3 | | (9, 19) | (11, 19) | (17, 19) |
| 4 | (4, 19) | | | |
| 5 | (5, 19) | | (12, 19) | |
| 6 | | | | |
| 7 | | | (13, 19) | |
| 8 | (6, 19) | (10, 19) | | (18, 19) |
| 9 | | | | |
| 10 | | | | (19, 19) |
| 11 | | | (14, 19) | |

FIG. 2

| Configured serving cell (or CC) index | DL assignment count | DL/UL DCI format |
|---|---|---|
| 11 | | |
| 10 | 7 | |
| 9 | 6(missed) | T-DAI field = 10 (indicate $X_{DAI}^{Total}=3$) |
| 8 | 5 | |
| 7 | | |
| 6 | 4 | |
| 5 | 3 | |
| 4 | 2 | |
| 3 | | |
| 2 | | |
| 1 | 1 | |
| 0 | | |

FIG. 3

| CC index | DL assignments (A_DAI, T_DAI) | | | |
|---|---|---|---|---|
| | DL Subfame#0 | DL Subfame#1 | DL Subfame#2 | DL Subfame#3 |
| 0 | (1, 13) | | | DL SPS PDSCH |
| 1 | (2, 13) | (6, 13) | | |
| 2 | (2, 13) | | | |
| 3 | (3, 13) | (7, 13) | (9, 13) | |
| 4 | (4, 13) | | | |
| 5 | (5, 13) | (8, 13) | (10, 13) | |
| 6 | | | | |
| 7 | | | (11, 13) | |
| 8 | | | | |
| 9 | | | | |
| 10 | | | (12, 13) | |
| 11 | | | | |

FIG. 4

| CC index | DL assignments (A_DAI, T_DAI) | | | |
|---|---|---|---|---|
| | DL Subframe#0 | DL Subframe#1 | DL Subframe#2 | DL Subframe#3 |
| 0 | (1, 5) | | | DL SPS PDSCH |
| 1 | (2, 5) | (6, 8) | | |
| 2 | (2, 5) | | | |
| 3 | (3, 5) | (7, 8) | | |
| 4 | (4, 5) | | (9, 12) | |
| 5 | | | (10, 12) | |
| 6 | | | | |
| 7 | (5, 5) | (8, 8) | (11, 12) | |
| 8 | | | | |
| 9 | | | | |
| 10 | | | (12, 12) | |
| 11 | | | | |

APPARATUS AND METHOD FOR PERFORMING HYBRID AUTOMATIC REPEAT REQUEST OPERATION IN WIRELESS COMMUNICATION SYSTEM SUPPORTING CARRIER AGGREGATION

CROSS-REFERENCE TO RELATED APPLICATION

This application is a continuation of U.S. patent application Ser. No. 16/525,292, filed on Jul. 29, 2019, which is a continuation of U.S. patent application Ser. No. 15/344,436, filed on Nov. 4, 2016, now U.S. Pat. No. 10,404,438, which claims priority from and the benefit of Korean Patent Application No. 10-2015-0156038, filed on Nov. 6, 2015, which is hereby incorporated by reference in its entirety.

BACKGROUND

1. Field

The present disclosure relates to wireless communication that supports carrier aggregation, and more particularly, to a method and apparatus for determining the size of a HARQ-ACK codebook on an uplink data transmission channel and for executing a HARQ operation based on a HARQ-ACK codebook of the determined size.

2. Discussion of the Background

Carrier aggregation (CA) is referred to as spectrum aggregation or bandwidth aggregation, which supports a plurality of carriers. An individual unit frequency bound by CA is referred to as a serving cell or a component carrier (CC). Each serving cell is defined by a bandwidth and a center frequency. CA provides the same effect as the case in which a plurality of bands, which are physically continuous or non-continuous in the frequency domain, are bound and used as a logically large band.

As wireless communication traffic rapidly increases, the introduction of a licensed assisted access (LAA) has been considered. This is a scheme of performing CA by utilizing frequencies of an unlicensed band in addition to a licensed band that is exclusively allocated to a mobile carrier. Using LAA, a UE may utilize a larger number of serving cells (a maximum of 32 serving cells) than the number of serving cells that may be aggregable in an existing licensed band.

When an increased number of serving cells are configured by CA for a UE, the number of downlink data channels increases based on the number of serving cells. Accordingly, a larger number of HARQ ACKs, which indicate whether a downlink data channel is successfully received, need to be transmitted from the UE to an eNB. Here, the HARQ ACK may be transmitted on a new uplink control channel (PUCCH format 4 or 5), or may be transmitted together with an uplink data channel (which is referred to as piggyback). When an ACK or a NACK associated with a plurality of downlink data channels is transmitted on a single associated uplink data channel, a combination of an ACK or a NACK with respect to each downlink data channel may correspond to a single code included in a HARQ ACK codebook. Therefore, a UE determines an ACK or a NACK with respect to a downlink data channel that the UE receives, and then generates a HARQ-ACK based on a HARQ ACK codebook.

In the case of LAA, a channel associated with an unlicensed band is randomly obtained, and thus, the number of downlink data channels dynamically changes. Accordingly, the size of a HARQ ACK codebook that piggybacks on an uplink data channel also dynamically changes. In this instance, the UE transmits a HARQ ACK based on a HARQ ACK codebook with a size that is determined based on downlink data channels that the UE recognizes. When the UE fails to recognize some downlink data channels due to the deterioration of a channel condition, the size of the HARQ ACK codebook that the UE makes reference to and the size of the HARQ ACK codebook that the eNB actually intends to determine may be different from each other.

Therefore, to enable the UE to successfully encode a HARQ ACK and to enable the eNB to successfully decode the HARQ ACK, both the UE and the eNB are required to accurately recognize the size of a HARQ ACK codebook that dynamically changes. However, a technology that enables the above has not yet been disclosed and thus, there is a desire to overcome the drawback thereof.

SUMMARY

Both a UE and an eNB are capable of accurately recognizing the size of a HARQ ACK codebook that dynamically changes. Also, an uplink HARQ-ACK overhead may be effectively controlled and the reliable uplink transmission and downlink data performance may be secured.

Particularly, the eNB sets the size of a HARQ ACK codebook that dynamically changes by taking into consideration configured serving cell(s). In other words, through a scheme that sets the size of a HARQ ACK codebook based on an A-DAI value and a T-DAI value and that indicates the same to the UE through a piece of control information, a system supports the UE in effectively performing a HARQ operation. As the size of a HARQ ACK codebook is dynamically determined with respect to serving cell(s) configured by the UE, and because an overhead with respect to an uplink HARQ ACK transmission is efficiently configured by taking into consideration the determined size of the HARQ ACK codebook, HARQ with respect to actually scheduled data transmission may be controlled Also, a scheme may efficiently generate a HARQ ACK codebook if it determines the size of a HARQ ACK codebook by taking into account the association relationship between an SPS PDSCH transmission and a MIMO transmission mode through which 2TBs are transmitted. Accordingly, the UE and the eNB may efficiently perform data transmission/reception.

According to an exemplary embodiment, there is provided a method of performing hybrid automatic repeat request (HARQ) by a user equipment (UE) in a wireless communication system that supports carrier aggregation (CA), the method including: receiving, from an evolved nodeB (eNB), a downlink grant on a first Physical Downlink Control Channel (PDCCH), the downlink grant including an accumulated downlink assignment indicator (A-DAI) field and a total DAI (T-DAI) field, the A-DAI field indicating a sum of the number of PDCCHs indicating semi persistent scheduling (SPS) release and the number of Physical Downlink Shared Channels (PDSCHs) accumulated up to a current subframe within a bundling window associated with HARQ-ACK reporting of the UE based on at least one serving cell, and the T-DAI field indicating a sum of the number of PDCCHs indicating SPS release and the number of all PDSCHs scheduled in association with HARQ-ACK reporting of the UE; receiving a first PDSCH indicated by the first PDCCH, the first PDSCH being transmitted from the eNB; receiving, from the eNB, an uplink grant on a second PDCCH, the uplink grant indicating a transmission of a Physical Uplink Shared Channel (PUSCH); determining a size of a HARQ-ACK codebook to which a HARQ-ACK with respect to the first PDSCH is to be mapped, based on the A-DAI and the T-DAI; and transmitting, to the eNB, the HARQ-ACK with respect to the first PDSCH on the PUSCH.

According to an exemplary embodiment, there is provided a user equipment (UE) to perform hybrid automatic repeat request (HARD) in a wireless communication system that supports carrier aggregation (CA), the UE including: an RF circuit that receives, from an evolved node B (eNB), a downlink grant on a first Physical Downlink Control Channel (PDCCH), receives a first PDSCH indicated by the first PDCCH, the first PDSCH being transmitted from the eNB, and receives, from the eNB, an uplink grant on a second PDCCH, the uplink grant indicating a transmission of a Physical Uplink Shared Channel (PUSCH), wherein the downlink grant includes an accumulated downlink assignment indicator (A-DAI) field and a total DAI (T-DAI) field, the A-DAI field indicates a sum of the number of PDCCHs indicating semi persistent scheduling (SPS) release and the number of Physical Downlink Shared Channels (PDSCHs) accumulated up to a current subframe within a bundling window associated with HARQ-ACK reporting of the UE based on at least one serving cell, and the T-DAI field indicates a sum of the number of PDCCHs indicating SPS release and the number of all PDSCHs scheduled in association with HARQ-ACK reporting of the UE; and a processor that determines a size of a HARQ-ACK codebook to which a HARQ-ACK with respect to the first PDSCH is to be mapped, based on the A-DAI and the T-DAI, and generates a HARQ-ACK with respect to the first PDSCH. The RF circuit transmits, to the eNB, the HARQ-ACK with respect to the first PDSCH on the PUSCH.

BRIEF DESCRIPTION OF THE DRAWINGS

FIGS. 1A to 1F are diagrams illustrating an example of applying a downlink grant including an A-DAI field and a T-DAI field to an FDD or TDD PUCCH cell group according to the present disclosure.

FIG. 2 is a diagram illustrating a method of calculating the size of a HARQ-ACK codebook according to a second embodiment of the present disclosure.

FIG. 3 is a diagram illustrating a method of determining the size of a HARQ-ACK codebook when a DL SPS PDSCH transmission exists according to an example of the present disclosure.

FIG. 4 is a diagram illustrating a method of determining the size of a HARQ-ACK codebook when a DL SPS PDSCH transmission exists according to another example of the present disclosure.

DETAILED DESCRIPTION OF THE ILLUSTRATED EMBODIMENTS

Figure 5:
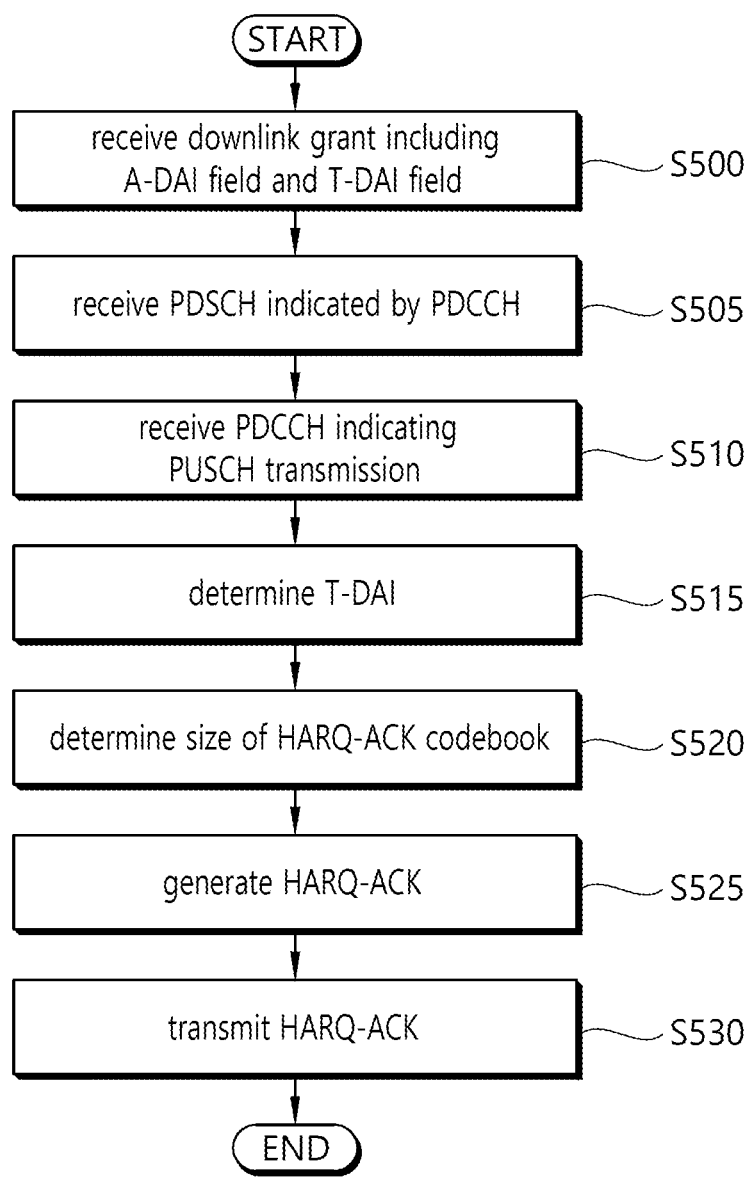
FIG. 5 is a flowchart illustrating a method for a UE to transmit a HARQ-ACK according to an example of the present disclosure.

Hereinafter, license assisted access (LAA) refers to a wireless communication scheme that supports a CA operation with respect to one or more secondary serving cells (SCells) that operate in an unlicensed band or an unlicensed spectrum, based on the assistance of a primary serving cell (PCell) that operates in a licensed band or a licensed spectrum. In other words, LAA refers to a scheme that binds a licensed band and an unlicensed band through CA by using a carrier in an LTE licensed band (licensed carrier (LC)) as an anchor. A UE may access a network through a licensed band and use a service, and an eNB aggregates a licensed band and an unlicensed band through CA and offloads traffic from the licensed band into the unlicensed band, depending on the situation.

A communication system that is capable of configuring serving cells for a UE through CA from at least five serving cells to a maximum of 32 serving cells may be capable of controlling the size of a HARQ-ACK codebook dynamically or of being adaptive to a channel condition, in addition to determining the size of a HARQ-ACK codebook semi-statically, a function which is led by a higher layer such as RRC. The scheme enables an effective control of an uplink HARQ-ACK overhead and it secures a reliable uplink transmission and downlink data performance.

Therefore, when a maximum of 32 serving cells are configured for a UE, the operations of a higher layer, such as RRC may include at least one out of operations (1) to (4) provided below.

(1) HARQ-ACK Codebook Configuration

The operation of a higher layer may include an indication operation which is associated with whether a semi-static HARQ-ACK codebook configuration or a dynamic HARQ-ACK codebook configuration is to be applied. To this end, an eNB may transmit, to a UE, information indicating the configuration of a semi-static HARQ-ACK codebook or a dynamic HARQ-ACK codebook. The semi-static HARQ-ACK codebook configuration is a first mode in which the eNB transmits, to the UE, a higher layer signaling associated with the size of a HARQ-ACK codebook. The dynamic HARQ-ACK codebook configuration is a second mode in which the eNB transmits, to the UE, a higher layer signaling associated with the size of a HARQ-ACK codebook. In the second mode, the UE needs to determine (predict, or decide) the size of a dynamic HARQ-ACK codebook based on information that is different from a higher layer signaling, which will be described later through detailed embodiments.

The reason that the modes are distinguished as described above is that a scheme of applying a dynamic HARQ-ACK codebook may increase the complexity of the embodiment of an eNB and a UE when compared to a gain associated with the purpose of optimizing the size of a HARQ-ACK codebook when the number of serving cells is about 6 to 7. Therefore, in the case of CA of 5 or more serving cells, the configuration of a HARQ-ACK codebook size based on semi-static parameters needs to be supported.

(2) FDD/TDD PUCCH Cell Group Configuration

The operation of a higher layer may include an FDD/TDD PUCCH cell group configuration. For example, when a PUCCH SCell is not configured, only a single cell group including a PCell may exist. In this instance, the concept of a cell group is not applied, and thus, the environment is identical to the existing environment. As another example, when a PUCCH SCell is configured, a maximum of two PUCCH cell groups may be configured.

(3) Serving Cell Configuration Including More than 5 Serving Cells in FDD CA or TDD CA (Including TDD-FDD CA)

The operation of a higher layer may include configuring more than 5 serving cells in FDD CA or TDD CA (including TDD-FDD CA). In TDD CA or TDD-FDD CA, a plurality of downlink subframes may be associated with a single uplink subframe as a bundling window. In this instance, although 5 or fewer serving cells are configured, a larger number of HARQ-ACK bits may be generated (e.g., the number of HARQ-ACK bits>22). Therefore, in TDD CA or TDD-FDD CA, the number of serving cells may be determined based on 22 bits, which is the maximum HARQ-ACK bit size that PUCCH format 3 may transmit.

(4) PUCCH Format 4 or 5 Configuration

The operation of a higher layer may include setting an RRC parameter required for the configuration of PUCCH format 4 or 5.

When the dynamic HARQ-ACK codebook configuration (second mode) is applied to a UE and/or an eNB, the UE may determine (predict or decide) the size of a HARQ-ACK codebook based on downlink control information (DCI).

The DCI is information that is transmitted by being mapped onto a PDCCH or an EPDCCH, and includes a downlink grant that schedules a downlink data transmission and an uplink grant that schedules an uplink data transmission. According to the present embodiment, when a maximum of 32 serving cells are configured for a UE, DCI may include at least one out of an accumulated downlink assignment indicator (A-DAI) field and a total downlink assignment indicator (T-DAI) field. Alternatively, the DCI may include a single integrated DAI field that includes an indicator conveyed by both the A-DAI and the T-DAI. In the following embodiments, although the descriptions are provided by assuming the case in which the indication conveyed by the T-DAI is provided through a separate T-DAI field, the indication and a processing method thereof are equally applied even in the case of an integrated DAI field.

The A-DAI is included in a downlink grant (DL A-DAI). A UL DAI exists in an uplink grant.

The DL A-DAI indicates the number of downlink (E)PDCCHs indicating SPS release and the number of PDSCHs accumulated up to a current subframe in a bundling window/serving cell CC set based on at least one serving cell. The DL A-DAI is transmitted by a 2-bit or 3-bit A-DAI field included in a downlink grant.

The UL DAI indicates the number of downlink (E)PDCCHs indicating SPS release and the total number of PDSCHs scheduled by an eNB in a bundling window based on at least one serving cell.

That is, the definition and the application method thereof may change based on whether the A-DAI field is included in the downlink grant or the uplink grant. The A-DAI may be used only for TDD UL-DL configurations 1 to 6, and may not be used for TDD UL-DL configuration 0. Also, in the case of i) a TDD system that supports a different TDD-UL-DL configuration for each serving cell or ii) a TDD system that uses a DL reference UL-DL configuration for a HARQ-ACK timing in the TDD-FDD CA configuration, the DL reference UL-DL configuration may replace the TDD UL-DL configuration and may be used.

Unlike the semi-static HARQ-ACK codebook configuration in which the size of a HARQ-ACK codebook is fixed, the dynamic HARQ-ACK codebook configuration needs to determine the size of a HARQ-ACK codebook based on the number of accumulated PDSCHs (A-DAI) that the UE receives within a bundling window and a set service cell (or CC). For example, when the number of accumulated PDSCHs is 2, a 2-bit HARQ-ACK is generated based on 1 transport block (TB) per PDSCH. That is, the size of the HARQ-ACK codebook is 2. When an eNB transmits two PDSCHs to a UE in a bundling window and the UE fails to detect a PDCCH (or EPDCCH) associated with a last PDSCH (the loss of a second A-DAI), the UE recognizes that the number of PDSCHs is 1, generates a 1-bit HARQ-ACK, and transmits the same to the eNB. In this instance, the size of the HARQ-ACK codebook is 1. However, the eNB expects that a HARQ-ACK is to be transmitted based on a HARQ-ACK codebook having a size of 2 since the eNB transmits two PDSCHs. The HARQ-ACK that is based on a codebook having a size of 1 is different from the HARQ-ACK that the eNB originally intends.

As described above, in the dynamic HARQ-ACK codebook configuration, there is a limitation in expecting the reliable size of a HARQ-ACK codebook based on only an A-DAI. Particularly, when the UE misses the last (E)PDCCH or PDSCH transmitted by the eNB, or when the UE misses a corresponding (E)PDCCH indicating whether 1CW is transmitted or 2CWs are transmitted in a MIMO transmission mode, this may be a problem.

The present embodiment defines a DCI including a T-DAI so that an eNB and a UE support a reliable dynamic HARQ-ACK codebook configuration.

The T-DAI indicates the number of all PDSCHs which are scheduled in association with HARQ-ACK reporting of the UE. In this instance, all PDSCHs are counted over the frequency axis (set serving cells) and the time axis (a bundling window). The T-DAI indicates the total number of (E)PDCCHs (DL assignment) indicating SPS release/associated PDSCHs based on a current subframe. Alternatively, the T-DAI indicates the total number of (E)PDCCHs (DL assignment) indicating PDSCH/SPS release within the set serving cells/bundling window size. Alternatively, in the above described two counting methods, the T-DAI may count the number of CWs (TBs) instead of counting the number of (E)PDCCHs indicating PDSCH/SPS release.

Alternatively, the T-DAI may indicate the sum of the number of (E)PDCCHs that indicates SPS releases and the number of all PDSCHs that are scheduled in association with HARQ-ACK reporting of the UE. In this instance, the (E)PDCCHs indicating SPS release and all the PDSCHs may be counted over the frequency axis and the time axis.

The T-DAI is transmitted through a T-DAI field included in a downlink grant. The T-DAI field may be 2 bits or 3 bits. The T-DAI may be used when the UE determines the size of a dynamic HARQ-ACK codebook, together with the A-DAI. The A-DAI indicates the number of (E)PDCCHs indicating SPS release and PDSCHs accumulated at each DCI transmission. Conversely, the T-DAI equally indicates the total number of (E)PDCCHs indicating SPS release and PDSCHs at each DCI transmission. The T-DAI prevents the confusion that happens when obtaining the A-DAI value fails at the last time or serving cell, and may be helpful to improve the total DL data performance. Also, in the case of counting T-DAIS, a DL SPS PDSCH transmission that is transmitted without a downlink grant (DL DCI) may be included or may be excluded.

Here, a scheme of applying an A-DAI and/or a T-DAI and a method of determining the size of a HARQ-ACK codebook may be determined to be dependent upon the number of serving cells that are available for CA and upon a duplex scheme of a serving cell through which a PUCCH is transmitted (since a HARQ-ACK transmission timing changes based on them). They are listed up as follows.

FIG. 1B illustrates an example of a case in which an A-DAI field and a T-DAI field are included in a downlink grant in a TDD PUCCH cell group. The case corresponds to TDD and thus, it may be extended to multiple downlink subframes by a bundling window for each serving cell, and the number of A-DAIs accumulatively increases as a CC number increases in the frequency axis and as a subframe number increases. Conversely, the T-DAI indicates the number of (E)PDCCHs indicating SPS release and/or the number of all PDSCHs that are scheduled in the frequency axis and the time axis for a predetermined UE up to a current subframe. For example, the total number of PDSCHs scheduled in the frequency/time axis up to a DL subframe #0 is 5 and thus, T-DAI=5 in the DL subframe #0 irrespective of a CC.

TABLE 1

| The number of serving cells available for CA | Use case | FDD CA, FDD-TDD CA(PCell FDD) | TDD, TDD CA, TDD-FDD CA(PCell TDD) |
|---|---|---|---|
| 5 or fewer (Legacy system, Rel. 12) | Downlink grant | No DAI field | TDD UL-DL configuration #0: no DAI field<br>TDD UL-DL configuration #1-6: time axis A-DAI field |
| | Uplink grant | No DAI field | TDD UL-DL configuration #0: no DAI field<br>TDD UL-DL configuration #1-6: use T-DAI field for each serving cell (or CC) |
| | Determine HARQ-ACK codebook size for PUCCH | Semi-static HARQ-ACK codebook configuration | Semi-static HARQ-ACK codebook configuration |
| | Determine HARQ-ACK codebook size for PUSCH | Determine HARQ-ACK codebook size for PUCCH | Use T-DAI field for each serving cell (or CC) |
| 6 to 32 (Advanced system, Rel. 13) | Downlink grant | Use frequency axis A-DAI field | Use frequency/time axis A-DAI field |
| | Uplink grant | — | — |
| | Determine HARQ-ACK codebook size for PUCCH | Semi-static or static HARQ-ACK codebook configuration | Semi-static or static HARQ-ACK codebook configuration |
| | Determine HARQ-ACK codebook size for PUSCH | Semi-static or static HARQ-ACK codebook configuration | Semi-static or static HARQ-ACK codebook configuration |

FIGS. 1A to 1F are diagrams illustrating an example of applying a downlink grant including an A-DAI field and a T-DAI field to an FDD or TDD PUCCH cell group according to the present disclosure.

FIGS. 1A to 1D illustrate the case in which a T-DAI indicates the number of (E)PDCCHs indicating SPS release and/or the number of all PDSCHs that are scheduled in the frequency axis and the time axis for a predetermined UE up to a current subframe. FIGS. 1E and 1F illustrate the case in which the T-DAI indicates the number of (E)PDCCHs indicating SPS release and/or the number of all PDSCHs that are scheduled in the frequency axis and the time axis for a predetermined UE throughout all subframes.

FIG. 1A illustrate an example of a case in which an A-DAI field and a T-DAI field are included in a downlink grant in an FDD PUCCH cell group. The downlink grant in CC #0 includes A-DAI field 1 and T-DAI field 1. The downlink grant in CC #2 includes A-DAI field 2 and T-DAI field 2. The downlink grant in CC #4 includes A-DAI field 3 and T-DAI field 3. The downlink grant in CC #5 includes A-DAI field 4 and T-DAI field 4. The downlink grant in CC #8 includes A-DAI field 5 and T-DAI field 5.

The number of all PDSCHs that are scheduled in the frequency axis and the time axis based on a current subframe is 5 (CC #0, #2, #4, #5, #8). Therefore, T-DAI field 1, T-DAI field 2, T-DAI field 3, T-DAI field 4, and T-DAI field 5 indicate T-DAI=5.

However, A-DAI field 1, 2, 3, 4, and 5 indicate A-DAI=1, A-DAI=2, A-DAI=3, A-DAI=4, A-DAI=5, respectively, in CC #0, #2, #4, #5, and #8. Therefore, in CC #0, #2, #4, #5, and #8, (A-DAI, T-DAI) may be given as (1, 5), (2, 5), (3, 5), (4, 5), and (5, 5), respectively.

The total number of PDSCHs scheduled in the frequency/time axis up to a DL subframe #1 is 8 including the previous DL subframe #0, and thus, T-DAI=8 in the DL subframe #1 irrespective of a CC. In the same manner, the total number of PDSCHs scheduled in the frequency/time axis up to a DL subframe #2 is 12 including the previous DL subframes #0 and #1, and thus, T-DAI=12 in the DL subframe #2, irrespective of a CC. The total number of PDSCHs scheduled in the frequency/time axis up to a DL subframe #3 is 16 including the previous DL subframes #0, #1, and #2, and thus, T-DAI=16 in the DL subframe #3, irrespective of a CC.

Referring to FIG. 1C, it is the case in which some CCs are set to a MIMO mode and 2TBs per CC are possible. In FIG. 1C, CC #0, #2, and #4 are set to a MIMO mode, and only CC #0 and CC #2 allow a 2TBs-per-CC transmission, and the remaining CCs allow a 1 TB-per-CC transmission.

The number of CWs(TBs) in all the PDSCHs that are scheduled in the frequency axis and the time axis based on a current subframe is 7 (2(CC #0)+2(CC #2)+1(CC #4),1 (CC #5)+1(CC #8)). Therefore, all of the T-DAI fields that are transmitted in each CC in a current subframe indicate T-DAI=7. That is, A-DAFT-DAT fields in a downlink grant execute counting based on a CW(TB) unit, as opposed to a PDSCH transmission unit. An (E)PDCCH transmission indicating DL SPS release may be always counted based on 1 CW.

In the case of 2TBs-per-CC, a PDSCH including two CWs(TBs) is transmitted in a corresponding CC and thus, the number of A-DAIs increases by 2 for each PDSCH (or serving cell) when the number of A-DAIs is counted based on a CW unit. A HARQ-ACK therefore requires 2 bits, and thus, the size of a HARQ-ACK codebook increases by 2. Therefore, in FIG. 1C, (A-DAT, T-DAI) may be (2, 7) and (4, 7) in CC #0 and #2, and (A-DAT, T-DAI) may be (5, 7), (6, 7), and (7, 7) in CC #4, #5, and #8.

Referring to FIG. 1D, it is the case in which some CCs are set to a MIMO mode and 2TBs per CC are possible. In FIG. 1D, CC #0, #1, and #2 are set to a MIMO mode, and only CC #0 and CC #1 allow a 2TBs-per-CC transmission, and the remaining CCs allow a 1 TB-per-CC transmission. In the same manner as FIG. 1C, FIG. 1D illustrates an example of executing DAT counting based on a CW unit.

Also, TDD is a PUCCH serving cell and thus, it can be extended to multiple downlink subframes by a bundling window, and the number of A-DAIs accumulatively increases as a CC number increases in the frequency axis, and subsequently, as a subframe number increases. Conversely, the T-DAI indicates the number of (E)PDCCHs indicating SPS release and/or the number of all PDSCHs that are scheduled in the frequency axis and the time axis for a predetermined UE up to a current subframe. For example, the total number of PDSCHs scheduled in the frequency/time axis up to a DL subframe #0 is 6 by taking into consideration 2TBs (CWs) in CC #0, and thus, T-DAI=6 in the DL subframe #0, irrespective of a CC. Therefore, in in DL subframe #0, (A-DAT, T-DAI) of CC #0 may be (2, 6), and (A-DAT, T-DAI) may be (3, 6), (4, 6), (5, 6), and (6, 6) in CC #2, #4, #5, and #8, respectively.

The total number of PDSCHs scheduled in the frequency/time axis up to a DL subframe #1 is 10 including the previous DL subframe #0 and thus, T-DAI=10 in the DL subframe #1, irrespective of a CC. In the same manner, the total number of PDSCHs scheduled in the frequency/time axis up to a DL subframe #2 is 14 including the previous DL subframes #0 and #1, and thus, T-DAI=14 in the DL subframe #2, irrespective of a CC.

FIG. 1E and FIG. 1F illustrate the case in which the T-DAI indicates the number of (E)PDCCHs indicating SPS release and/or the number of all PDSCHs that are scheduled in the frequency axis and the time axis for a predetermined UE throughout all subframes in a bundling window. Therefore, FIG. 1E shows that the T-DAI is fixed to 16 (T-DAI=16) throughout all subframes and CCs where PDSCHs are scheduled. FIG. 1F shows that the T-DAI is fixed to 19 (T-DAI=19) throughout all subframes and CCs where PDSCHs are scheduled. In FIG. 1E, counting is performed based on the number of (E)PDCCHs indicating DL SPS release and PDSCHs. Also, FIG. 1E is the case in which MIMO is not set, and FIG. 1F illustrates the case in which MIMO is set for some CCs and the number of A-DAIs and the number of T-DAIs are counted based on a CW(TB). Therefore, in FIG. 1F, the number of A-DAIs may increase by 2 in CC #0 and CC #1.

Hereinafter, embodiments in which a UE dynamically determines the size of a HARQ-ACK codebook based on an A-DAI and a T-DAI will be disclosed. Particularly, the present embodiments will be described under the assumption of the case in which HARQ-ACK reporting with respect to a downlink data (PDSCH) transmission of a previous subframe of a current subframe needs to be transmitted in parallel with an uplink data (PUSCH) transmission in the current subframe that needs to perform the uplink data (PUSCH) transmission. However, the present embodiments may be equally applied when HARQ-ACK reporting is performed based on a PUCCH format.

[Case 1] Determination Based on a Downlink Grant Including a T-DAI Field

The case may occur in which a PUSCH transmission indicated by a previous subframe (e.g., subframe n-4 in FDD PUCCH cell group, subframe n-k in TDD PUCCH cell group) of a current subframe (e.g., subframe n) may be transmitted together with HARQ-ACK information with respect to an (E)PDCCH indicating a SPS release and a PDSCH, which is transmitted in the previous subframe (e.g., subframe n-4 in FDD PUCCH cell group, subframe n-k in TDD PUCCH cell group).

In this instance, a UE may determine (or calculate) the size of a HARQ-ACK codebook with respect to the (E)PDCCH that indicates SPS release and a PDSCH transmitted over at least one serving cell, based on the T-DAI field included in a downlink grant. Two embodiments will be disclosed in association with the method of determining the size of a HARQ-ACK codebook based on a T-DAI field.

(First Embodiment) Determining the size of a HARQ-ACK codebook based on a T-DAI that is actually allocated to a UE According to the present embodiment, a UE determines a T-DAI that is actually allocated to the UE based on an A-DAI field and a T-DAI field.

Here, the value of a single T-DAI field may correspond to a plurality of T-DAIS (that is, a T-DAI set). In other words, a plurality of T-DAIS may be indicated by a single T-DAI field value. For example, when a T-DAI field is 2 bits as shown in following Table 2, the T-DAI field has four values $X_{DAI}^{total}$, that is, 00, 01, 10, and 11, and a single value may be mapped to a plurality of T-DAIS.

TABLE 2

| T-DAI field (MSB, LSB) | $X_{DAI}^{total}$ | T-DAI set corresponding to T-DAI field |
| --- | --- | --- |
| 0, 0 | 1 | 1, 5, 9, 13, 17, 21, 25, 29 |
| 0, 1 | 2 | 2, 6, 10, 14, 18, 22, 26, 30 |
| 1, 0 | 3 | 3, 7, 11, 15, 19, 23, 27, 31 |
| 1, 1 | 4 | 0, 4, 8, 12, 16, 20, 24, 28, 32 |

Referring to Table 2, when $X_{DAI}^{total}$, a T-DAI that is actually allocated to a UE may be one of the values in the set {1, 5, 9, 13, 17, 21, 25, 29}. According to the scheme, a T-DAI may be indicated by minimizing the number of bits of the T-DAI field added to a DCI format. This is possible through the assumption that a probability of successively missing four (E)PDCCHs (assuming a 2-bit T-DAI field) is significantly low. A UE may derive a T-DAI that is actually allocated to the UE by taking into consideration a received A-DAI field and T-DAI field in a single bundling window (on a plurality of serving cells (or CCs) in a single subframe in the case of FDD, and on a plurality of serving cells (or CCs) in a plurality of subframes in the case of TDD).

For example, when a T-DAI field is 0,0 in Table 2, a latent T-DAI corresponds to {1, 5, 9, 13, 17, 21, 25, 29} and a UE derives one as an actually allocated T-DAI by taking into consideration an A-DAI value. It is assumed that a T-DAI field in a downlink grant that the UE receives is 0,0, and an A-DAI in a downlink grant that the UE receives in the last subframe is 4 (A-DAI=4). However, 4 does not exist in the T-DAI set {1, 5, 9, 13, 17, 21, 25, 29}. Therefore, the UE regards 5 which is the closest among the set {1, 5, 9, 13, 17, 21, 25, 29} as a T-DAI that is actually allocated to the UE. The UE determines that one PDCCH is lost.

Subsequently, the UE sets, as a NACK, a HARQ-ACK with respect to a PDSCH corresponding to A-DAI=5, and calculates the size of a HARQ-ACK codebook based on "T-DAI=5".

Table 3 shows an example in which a single T-DAI field value corresponds to a plurality of T-DAIs when a T-DAI field is 3 bits.

TABLE 3

| T-DAI field (MSB, LSB) | $X_{DAI}^{total}$ | T-DAI set corresponding to T-DAI field |
|---|---|---|
| 0, 0, 0 | 1 | 1, 9, 17, 24, 32 |
| 0, 0, 1 | 2 | 2, 10, 18, 25 |
| 0, 1, 0 | 3 | 3, 11, 19, 26 |
| 0, 1, 1 | 4 | 4, 12, 20, 27 |
| 1, 0, 0 | 5 | 5, 13, 21, 28 |
| 1, 0, 1 | 6 | 6, 14, 22, 29 |
| 1, 1, 0 | 7 | 7, 15, 23, 30 |
| 1, 1, 1 | 8 | 0, 8, 16, 24, 31 |

Referring to Table 3, when $X_{DAI}^{total}$, a T-DAI that is actually allocated to a UE may be one of the values in the set {1, 9, 17, 24, 32}. A method of deriving a T-DAI that is actually allocated to the UE is the same as the descriptions provided with reference to Table 2.

When the T-DAI that is actually allocated to the UE is determined, the UE may determine or calculate the size of a HARQ-ACK codebook based on the determined T-DAI and the number of bits (1 or 2) of a HARQ-ACK with respect to a PDSCH which is determined for each serving cell.

When counting the number of bits of a HARQ-ACK with respect to a PDSCH which is set for each serving cell and T-DAI counting is performed based on a codeword (CW) unit, the UE may use a T-DAI that is determined based on an A-DAI field and a T-DAI field as the size of a HARQ-ACK codebook.

When counting the number of bits of a HARQ-ACK with respect to a PDSCH which is set for each serving cell and when T-DAI counting is performed based on a PDSCH unit, the UE may not be aware of the actual number of CWs (or TBs) with respect to a missing PDSCH in a serving cell set to a MIMO transmission mode. Therefore, the UE may calculate the size of a HARQ-ACK codebook by assuming that the number of bits of a HARQ-ACK in the MIMO transmission mode is fixed in advance.

As an example of a fixed number of bits, a HARQ-ACK corresponding to a single A-DAI field may be fixed to 1 bit under the assumption that spatial bundling is applied to all serving cells. Under the assumption that a HARQ-ACK with respect to a missing PDSCH is 1 bit, the UE calculates the size of a HARQ-ACK codebook based on the determined T-DAI. The UE generates a 1-bit HARQ-NACK based on the fixed number of bits with respect to the missing PDSCH.

As another example of the fixed number of bits, a HARQ-ACK corresponding to a single A-DAI field may be fixed as 2 bits per CC, with respect to a serving cell that is set to an MIMO transmission mode. In this instance, the number of CWs that are actually scheduled to a PDSCH on a serving cell that is set to the MIMO is not considered. The UE may calculate the size of a HARQ-ACK codebook based on the determined T-DAI, under the assumption that a HARQ-ACK with respect to a missing PDSCH in a serving cell set to MIMO misses is 2 bits. The UE generates a 2-bit HARQ-NACK based on the fixed number of bits with respect to the missing PDSCH.

(Second Embodiment) Determining the size of a HARQ-ACK codebook based on the value of a received T-DAI field The present embodiment is a method of determining the size of a HARQ-ACK codebook assuming a situation in which an FDD PUCCH cell group is applied. When a PUSCH transmission is performed based on a received (E)PDCCH (DCI format 0 or 4), a UE determines the size of a HARQ-ACK codebook based on the value of a T-DAI field, and performs a HARQ-ACK transmission. To this end, the UE according to the present embodiment may calculate the total number of scheduled serving cells (or CCs).

An example of a method of calculating the total number of scheduled serving cells (or CCs) is as shown in Equation 1 provided below.

$$B^{DL}=X_{DAI}^{total}+\lceil (D-X_{DAI}^{total})/2^k \rceil \cdot 2^k \quad \text{[Equation 1]}$$

Referring to Equation 1, $B^{DL}$ indicates the number of CWs or the number of serving cells that require HARQ-ACK reporting out of the total serving cells. For example, when a PUSCH is transmitted in subframe n, $B^{DL}$ indicates the number of CWs or the number of serving cells (or DL CCs) that require HARQ-ACK reporting in subframe n-4 in the case of an FDD PUCCH cell.

In the case in which $B^{DL}$ is calculated as the number of serving cells (or DL CCs), the number of HARQ-ACK bits may be assumed as follows: i) a 1-bit HARQ-ACK always corresponds each serving cell by applying spatial bundling to a corresponding serving cell when a 2 TB transmission mode is set to the serving cell. ii) when a 1 TB transmission mode is set to a serving cell, 1 bit per CC is assumed without the application of spatial bundling.

Referring again to Equation 1, $X_{DAI}^{total}$ is the value of a T-DAI field, and the value may be 1 to $2^k$ based on the number of bits. Here, when a T-DAI field is 2 bits or 3 bits, a T-DAI set, such as those in Table 2 or Table 3, may correspond to the T-DAI field.

D denotes the number of CWs or the number of serving cells including an (E)PDCCH that indicates SPS release and a PDSCH received by a UE, out of the total serving cells configured for the UE.

$X_{DAI}^{total}$ and D may be counted based on an (E)PDCCH unit that indicates DL SPS release/a PDSCH, or may be counted based on a CW unit. In any case, the same counting scheme should be applied to both $X_{DAI}^{total}$ and D. An example of calculating the size of a HARQ-ACK codebook based on Equation 1 is the same as FIG. 2.

FIG. 2 is a diagram illustrating a method of calculating the size of a HARQ-ACK codebook according to the second embodiment.

FIG. 2 assumes a case in which an FDD PUCCH cell and 12 serving cells (or CCs) are set for a UE, and DL scheduling (or assignment) is indicated by an eNB for each serving cell in subframe n-4, as shown in FIG. 2, and a PUSCH transmission in subframe n (HARQ-ACK transmission timing) is indicated by an uplink grant. Also, it is assumed that T-DAI counting is performed based on an (E)PDCCH unit that indicates DL SPS release/a PDSCH unit.

When an eNB sets a T-DAI field (2 bits) in a downlink grant to "10" and transmits the downlink grant to a UE, $X_{DAI}^{total}=3$ may be indicated to the UE by the eNB.

When the UE misses a DL assignment corresponding to serving cell #9, D=6 which is the total accumulative number of (E)PDCCHs indicating DL SPS release/PDSCHs received by the UE. In this instance, the size of a HARQ-ACK codebook that piggybacks on a PUSCH is $B^{DL}=3+$ celing$\{(6-3)/2^2\}\cdot 2^2=7$, based on Equation 2. Here, the UE may recognize whether DL scheduling of serving cell #9 misses based on a DL A-DAI and/or other recognition schemes.

FIG. 3 is a diagram illustrating a method for determining the size of a HARQ-ACK codebook when a DL SPS PDSCH transmission exists according to an example of the present invention.

Referring to FIG. 3, when HARQ-ACK bits that need to be transmitted on a corresponding PUSCH are associated with a DL SPS PDSCH, in addition to an (E)PDCCH indicating SPS release and/or a PDSCH indicated by at least one downlink grant, the eNB increases a count by 1 in addition to the (E)PDCCH indicating DL SPS release and a PDSCH transmission indicated by the downlink grant by taking into consideration the DL SPS PDSCH transmission when setting a T-DAI.

In FIG. 3, the total number (T-DAI=12) is 12 when only PDSCHs are counted throughout DL subframes #0, #1, #2, and #3 and serving cells #0, #2, #4, #5, and #8. However, a DL SPS PDSCH exists, and thus a T-DAI count is increased by 1 and is set to T-DAI=13.

FIG. 4 is a diagram illustrating a method of determining the size of a HARQ-ACK codebook when a DL SPS PDSCH transmission exists according to another example of the present invention.

Referring to FIG. 4, a DL SPS PDSCH is excluded when a T-DAI is set. That is, an eNB sets a T-DAI based on only the number of (E)PDCCHs indicating SPS release and PDSCHs indicated by (E)PDCCHs. A UE and an eNB determines the final size of a HARQ-ACK codebook by adding N to the size of a HARQ-ACK codebook calculated based on the T-DAI. Here, N has 1 when a DL SPS PDSCH transmission exists. Otherwise, it has 0.

When only HARQ-ACK information corresponding to a DL SPS PDSCH transmission needs to be transmitted through a PUSCH, a UE may not be able to determine an A-DAI field and a T-DAI field due to the lack of a downlink grant. Accordingly, when a DL SPS PDSCH is received, the UE regards N=1 as the final size of a HARQ-ACK codebook, and performs a HARQ-ACK transmission.

In Case 1, a UE derives the size of a HARQ-ACK codebook on a PUSCH based on an A-DAI field and a T-DAI field included in a downlink grant and thus, including a T-DAI field in an uplink grant is not considered. As a matter of course, a DAI field may exist in an uplink grant in a TDD system. Accordingly, the function of the DAI field of the legacy TDD system may be equally applied. This may be listed in a table as provided below.

TABLE 4

| Cell group | Downlink grant format | Uplink grant format | |
| --- | --- | --- | --- |
| | | Option 1 | Option 2 |
| FDD PUCCH Cell group | Including A-DAI field and T-DAI field | No DAI field | No DAI field |
| TDD PUCCH Cell group | Including A-DAI field and T-DAI field | No DAI field | Legacy DAI field |

[Case 2] Determination Based on a Downlink Grant Including a T-DAI Field and an Uplink Grant Including a T-DAI Field The case may occur in which a PUSCH transmission indicated by a previous subframe (e.g., subframe n-4 in FDD PUCCH cell, subframe n-k in TDD PUCCH cell) of a current subframe (e.g., subframe n) may be transmitted together with HARQ-ACK information with respect to an (E)PDCCH indicating SPS release and a PDSCH transmitted in the previous subframe (e.g., subframe n-4 in FDD PUCCH cell group, subframe n-k in TDD PUCCH cell group).

In this instance, a UE may determine (or calculate) the size of a HARQ-ACK codebook with respect to the (E)PDCCH that indicates SPS release and an PDSCH transmitted over at least one serving cell based on a DL T-DAI field included in the downlink grant and a UL T-DAI field included in the uplink grant.

That is, unlike Case 1, in Case 2 both an uplink grant and a downlink grant include a T-DAI field. By including a T-DAI field in an uplink grant, double checking is possible when using only a downlink grant is insufficient to secure reliability in determining the size of a HARQ-ACK codebook. According to Case 2, a T-DAI field may be included in the uplink grant and thus, Table 4 may be modified to Table 5, as provided below.

TABLE 5

| Cell group | downlink grant format | uplink grant format | | | |
| --- | --- | --- | --- | --- | --- |
| | | Option 1 | Option 2 | Option 3 | Option 4 |
| FDD PUCCH cell group | Including A-DAI field and DL T-DAI field | Including UL T-DAI field | Including UL T-DAI field | Including UL T-DAI field | No DAI field |
| TDD PUCCH cell group | Including A-DAI field and DL T-DAI field | Including UL T-DAI field | Switching between UL T-DAI field and legacy DAI field is possible | Including legacy DAI field | Switching between UL T-DAI field and legacy DAI field is possible |

Referring to Table 5, Case 2 proposes a method of determining the size of a HARQ-ACK codebook when an A-DAI field and a DL T-DAI field are included in a downlink grant (i.e., DCI format 1/1A/1B/1D/2/2A/2B/2C/2D) as well as when a UL T-DAI field and/or legacy TDD DAI field is included in an uplink grant (i.e., DCI format 0/4) (Option 1 to 4). Here, a DL T-DAI field and a UL T-DAI field are differentiated so as to distinguish the case when the T-DAI field is included in a downlink grant from the case when substantially the same T-DAI field is included in an uplink grant, and they are equally called "T-DAI field".

A eNB redundantly transmits a T-DAI field through an uplink grant in addition to a downlink grant since it is difficult to exclude the case in which a UE fails to receive an actually allocated T-DAI. For example, when a small number of downlink grants are scheduled in a serving cell/bundling window (only TDD), a UE may fail to receive all of the downlink grants. Also, in an LAA environment, when a prepared (E)PDCCH is not normally transmitted and is dropped due to the failure of an LBT, a plurality of DAI values may not be transmitted to the UE (particularly, a transmission corresponding to consecutive (E)PDCCHs), and thus, the UE may be confused in association with an actual DAI value. Since the number of bits of a DAI field is limited to 2 to 3, ambiguity may be caused when a modulo operation reaches its limitation. For example, in the case of a 2-bit DAI field, when four consecutive (E)PDCCHs are missed, the modulo operation may not be normally performed.

Under the situation, to accurately obtain the size of a HARQ-ACK codebook, an eNB may transmit an uplink grant including a UL T-DAI field to a UE according to the embodiment of Case 2.

(Third Embodiment) when a PUSCH transmission is indicated by an (E)PDCCH (DCI format 0/4), a UE may determine the size of an entire HARQ-ACK codebook based on methods of option 1 to 4, and may perform a HARQ-ACK transmission.

For example, according to Option 1, a UL T-DAI field is included in an uplink grant. Therefore, a UE calculates the size of a HARQ-ACK codebook on a PUSCH based on a UL T-DAI field. In this instance, the UE may derive a T-DAI that is actually allocated to the UE based on the UL T-DAI field. The method that is the same as in Case 1 may be used. Here, when the size of a HARQ-ACK codebook calculated based on a DL T-DAI and the size of a HARQ-ACK codebook calculated based on a UL T-DAI are different from each other, the UE determines this as an erroneous situation, and determines the size of a HARQ-ACK codebook based on one that is most recently received out of the DL T-DAI and the UL T-DAI. Alternatively, when the DL T-DAI and the UL T-DAI are received in the same subframe recently and the values are different, the UE determines the size of a HARQ-ACK codebook based on one of the DL T-DAI and the UL T-DAI. Alternatively, the UE always determines the size of a HARQ-ACK codebook based on the UL T-DAI value.

As another example, according to Option 2, although a UL T-DAI field is used for an FDD PUCCH cell group, a legacy DAI field and a T-DAI field are selectively used for a T PUCCH cell group. In this instance, a standard for determining a field to be used may be based on a TDD UL-DL configuration of a TDD PUCCH cell group. For example, when a TDD PUCCH cell group is TDD UL-DL configuration #5, a T-DAI field is used. When other TDD UL-DL configurations are used, a legacy DAI field may be used, as opposed to a T-DAI field.

As another example, according to Option 3 a UL T-DAI field is not used for a TDD PUCCH cell group, and the UE may determine the size of a HARQ-ACK codebook by reusing a legacy DAI field. This case is different from the case of an FDD PUCCH cell group which uses a T-DAI field.

As another example, according to Option 4, an uplink grant associated with an FDD PUCCH cell group does not need any DAI field, and an uplink grant associated with a TDD PUCCH cell group may selectively include a legacy DAI field or a UL T-DAI field. For example, a standard for determining a field to be used may be based on a TDD UL-DL configuration (or DL reference UL-DL configuration) of a TDD PUCCH cell group. As another example, by adding a 1-bit indication field associated with a DAI configuration in a DCI format, it may be indicated to a UE whether a corresponding DAI field is a UL T-DAI field or a legacy DAI field.

(Fourth Embodiment) When a PUSCH transmission is not indicated by an (E)PDCCH (DCI format 0/4), a UE may determine the size of an entire HARQ-ACK codebook based on methods of Alt 1 to 3, and may perform a HARQ-ACK transmission. Alt 1 to 3 are methods of determining the size of a HARQ-ACK, particularly when a UE fails to receive a T-DAI field from both a downlink grant and an uplink grant.

For example, according to Alt 1, a T-DAI is determined based on $B^{DL}=\#$ of configured CCs*2. This assumes that 2TBs are transmitted through a PDSCH for each serving cell, irrespective of a transmission mode set for each serving cell. This assumption complies with the case in which T-DAI counting is performed based on the number of TBs (CWs) when a PUSCH transmission is indicated by an uplink grant.

As another example, according to Alt 2, a T-DAI is determined based on $B^{DL}=\#$ of configured CCs. This assumes that 1 TB is always transmitted through a PDSCH for each serving cell, irrespective of a transmission mode set for each serving cell. This assumption complies with the case in which T-DAI counting is performed based on the number of CCs when a PUSCH transmission is indicated by an uplink grant.

As another example, according to Alt 3, a UE determines $B^{DL}$ based on a DAI value (a value accumulated in a CC area at each scheduling) counted based on information included in a downlink grant and the size of a HARQ-ACK codebook on a PUSCH. Here, additional information associated with the size of a HARQ-ACK codebook may be information that an eNB provides to a UE or a UE provides to an eNB, to solve a loss of a DL assignment having a DAI field. For example, the value indicated by a DAI field corresponding to the lowest index may be a T-DAI. Therefore, an additional T-DAI field may not need to be included in an (E)PDCCH.

FIG. 5 is a flowchart illustrating a method for a UE to transmit a HARQ-ACK according to an example of the present disclosure. This is the case in which a T-DAI field is included in only a downlink grant according to Case 1.

Referring to FIG. 5, a UE receives, from an eNB, a downlink grant including a T-DAI field on a PDCCH in operation S500. Before operation S500, the UE may receive, from the eNB, information indicating the configuration of a semi-static HARQ-ACK codebook or a dynamic HARQ-ACK codebook. The semi-static HARQ-ACK codebook configuration is a first mode that the eNB transmits, to the UE, a higher layer signaling associated with the size of a HARQ-ACK codebook. The dynamic HARQ-ACK codebook configuration is a second mode that the eNB does not transmit, to the UE, a higher layer signaling associated with the size of a HARQ-ACK codebook. In the second mode, the UE may determine a T-DAI and the size of a HARQ-ACK codebook based on an A-DAI field and a T-DAI field.

The UE receives, from the eNB, a PDSCH indicated by the PDCCH in operation S505. As many PDSCHs as a value corresponding to a T-DAI may be transmitted in the time axis (at least one subframe) or the frequency (at least one serving cell or CC) in a given bundling window.

The UE receives an uplink grant indicating a PUSCH transmission from the eNB on an (E)PDCCH in operation S510. The downlink grant in operation S500 and the uplink grant in operation S510 may be received in the same subframe n. Also, the PUSCH may be transmitted in a subsequent subframe (e.g., subframe n+4 in FDD PUCCH cell, subframe n+k in TDD PUCCH cell) together with HARQ-ACK information with respect to the PDCCH indicating the PDSCH. Alternatively, the PUSCH may be transmitted together with HARQ-ACK information with respect to an (E)PDCCH indicating SPS release and the PDSCH.

A T-DAI field may correspond to a T-DAI set. For example, when the T-DAI field is 2 bits, Table 2 may be used. When the T-DAI field is 3 bits, Table 3 may be used. The UE determines a T-DAI that is actually allocated to the UE from the T-DAI set in operation S515. To this end, an A-DAI field and a T-DAI field may be used. The method of determining a T-DAI that is actually allocated to the UE in operation S515 may include the methods of determining a T-DAI, which have been described in Case 1.

The UE determines the size of a HARQ-ACK codebook in operation S520. The method in which the UE calculates the size of a HARQ-ACK codebook in operation S520 may include the methods of calculating the size of a HARQ-ACK codebook, which have been described in Case 1.

The UE generates a HARQ-ACK based on whether decoding (E)PDCCHs indicating DL SPS release/PDSCHs corresponding to a T-DAI are successfully decoded in operation S525. When ACKs or NACKs with respect to (E)PDCCHs indicating DL SPS release/PDSCHs corresponding to a T-DAI are transmitted on a single associated PUSCH, the UE matches a combination of ACKs and NACKs with respect to the (E)PDCCHs indicating DL SPS release/PDSCHs corresponding to T-DAI to a single code included in a HARQ-ACK codebook having the calculated size, thereby generating a HARQ-ACK. Here, the UE may generate a NACK with respect to an (E)PDCCH or a PDSCH that the UE misses. Detailed operations thereof include the method of generating a HARQ-ACK with respect to a missing PDCCH or PDSCH in Case 1 and Case 2.

The UE transmits the generated HARQ-ACK to the eNB on a PUSCH in a subsequent subframe (e.g., subframe n+4 in FDD PUCCH cell group, subframe n+k in TDD PUCCH cell group) in operation S530.

Figure 6:
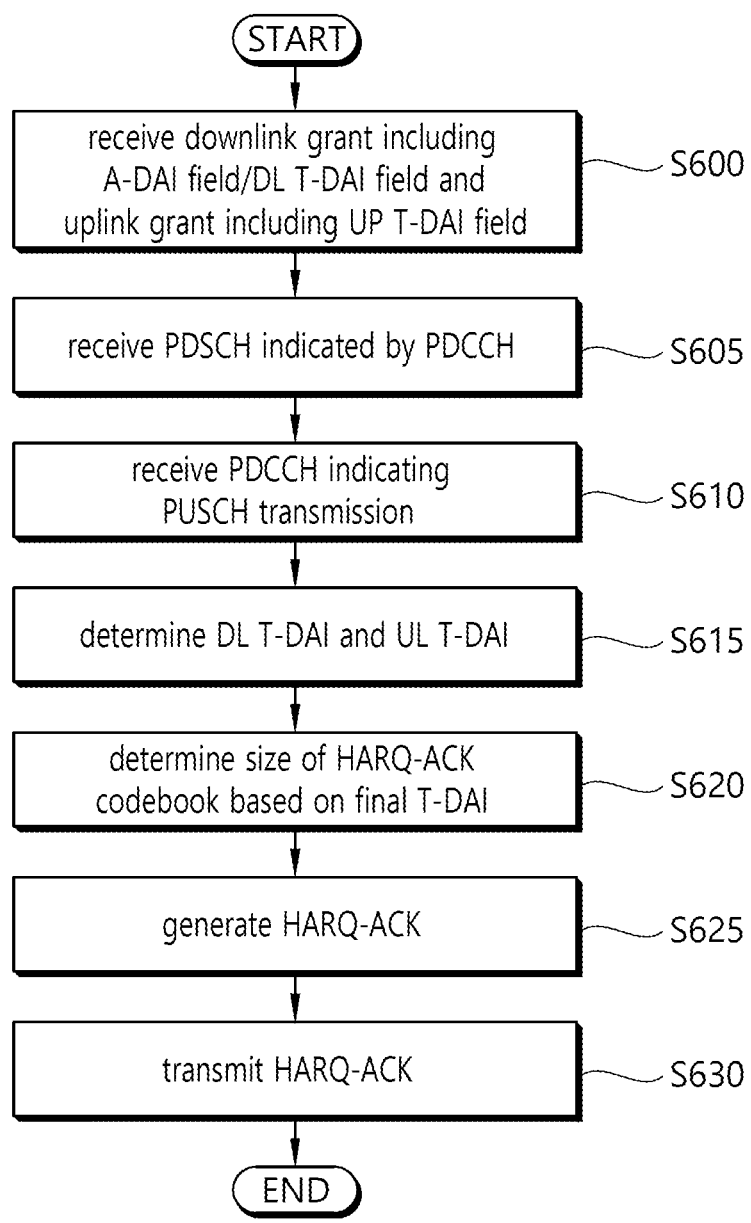
FIG. 6 is a flowchart illustrating a method for a UE to transmit a HARQ-ACK according to another example of the present disclosure.

FIG. 6 is a flowchart illustrating a method for a UE to transmit a HARQ-ACK according to another example of the present invention. This is the case in which a T-DAI field is included in both a downlink grant and an uplink grant according to Case 2.

Referring to FIG. 6, a UE receives, from an eNB a downlink grant including an A-DAI field and a DL T-DAI field and an uplink grant including a UL T-DAI field on different (E)PDCCHs in operation S600. According to Case 2, based on Options, the uplink grant may include a legacy DAI field instead of a UL T-DAI field (refer to Table 5).

Before operation S600, the UE may receive, from the eNB, information indicating the configuration of a semi-static HARQ-ACK codebook or a dynamic HARQ-ACK codebook. The semi-static HARQ-ACK codebook configuration is a first mode that the eNB transmits, to the UE, a higher layer signaling associated with the size of a HARQ-ACK codebook. The dynamic HARQ-ACK codebook configuration is a second mode that the eNB does not transmit, to the UE, a higher layer signaling associated with the size of a HARQ-ACK codebook. In the second mode, the UE may determine a final T-DAI and the size of a HARQ-ACK codebook based on an A-DAI field, a DL T-DAI field, and a UL T-DAI field.

The UE receives, from the eNB, a PDSCH indicated by the PDCCH in operation S605. As many PDSCHs as a value corresponding to the final T-DAI may be transmitted in the time axis (at least one subframe) or the frequency axis (at least one serving cell or CC) in a given bundling window.

The UE receives an uplink grant indicating the transmission of a PUSCH from the eNB on a PDCCH in operation S610. The uplink grant in operation S600 and the uplink grant in operation S610 may be the same as or different from each other. According to the former case, the downlink grant in operation S600 and the uplink grant in operation S610 may be received in the same subframe n. Also, the PUSCH may be transmitted in a subsequent subframe (e.g., subframe n+4 in FDD PUCCH cell group, subframe n+k in TDD PUCCH cell group) together with HARQ-ACK information with respect to the PDCCH indicating the PDSCH. Alternatively, the PUSCH may be transmitted together with HARQ-ACK information with respect to an (E)PDCCH indicating SPS release and the PDSCH.

A T-DAI field may correspond to a T-DAI set. For example, when the T-DAI field is 2 bits, Table 2 may be used. When the T-DAI field is 3 bits, Table 3 may be used. The UE determines a DL T-DAI based on the DL T-DAI field, and determines a UL T-DAI based on the UL T-DAI field in operation S615. The method of determining the DL T-DAI and the UL T-DAI in operation S615 may include the methods of determining a T-DAI, which have been described in Case 1.

The UE determines the size of a HARQ-ACK codebook based on the final T-DAI in operation S620. Operation S620 includes: an operation comparing the DL T-DAI and the UL T-DAI by the UE; an operation determining the final T-DAI based on the result of the comparison; and an operation calculating the size of a HARQ-ACK codebook based on the A-DAI and the final T-DAI. Operation S620 may include the methods of calculating the size of a HARQ-ACK codebook which have been described in Case 2. Alternatively, the UE determines the size of the entire HARQ-ACK codebook based on Alt 1 to 3 methods of Case 2, and performs a HARQ-ACK transmission.

The UE generates a HARQ-ACK based on whether PDSCHs corresponding to the final T-DAI are successfully decoded in operation S625. When ACKs or NACKs with respect to PDSCHs corresponding to the final T-DAI are transmitted on a single associated PUSCH, the UE matches a combination of ACKs and NACKs with respect to the PDSCHs corresponding to the final T-DAI to a single code included in a HARQ-ACK codebook having the calculated size, thereby generating a HARQ-ACK. Here, the UE may generate a NACK with respect to a PDCCH or PDSCH that the UE misses. Detailed operations thereof include the method of generating a HARQ-ACK with respect to a missing PDCCH or PDSCH in Case 1 and Case 2.

The UE transmits the generated HARQ-ACK to the eNB on a PUSCH in a subsequent subframe (e.g., subframe n+4 in FDD, subframe n+k in TDD) in operation S630.

Figure 7:
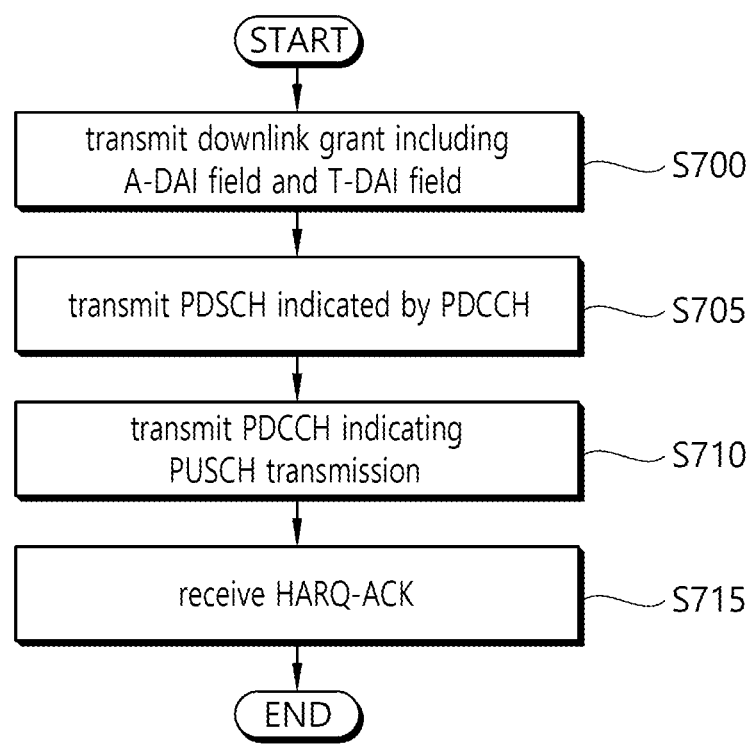
FIG. 7 is a flowchart illustrating a method for an eNB to receive a HARQ-ACK according to an example of the present disclosure.

FIG. 7 is a flowchart illustrating a method for an eNB to receive a HARQ-ACK according to an example of the present invention. This is the case in which a T-DAI field is included in only a downlink grant according to Case 1.

Referring to FIG. 7, an eNB sets an A-DAI and a T-DAI and transmits a downlink grant, including an A-DAI field indicating the set A-DAI and a T-DAI field indicating the set T-DAI, to a UE on a PDCCH in operation S700. Before operation S700, the eNB may transmit, to the UE, information indicating the configuration of a semi-static HARQ-ACK codebook or a dynamic HARQ-ACK codebook. The semi-static HARQ-ACK codebook configuration is a first mode that the eNB transmits, to the UE, a higher layer signaling associated with the size of a HARQ-ACK codebook. The dynamic HARQ-ACK codebook configuration is a second mode that the eNB does not transmit, to the UE, a higher layer signaling associated with the size of a HARQ-ACK codebook. In the second mode, the UE may determine a T-DAI and the size of a HARQ-ACK codebook based on an A-DAI field and a T-DAI field.

The eNB transmits, to the UE, a PDSCH indicated by the PDCCH in operation S705. As many PDSCHs as a value corresponding to a T-DAI may be transmitted in the time axis (at least one subframe) or the frequency (at least one serving cell or CC) in a given bundling window.

The eNB transmits an uplink grant indicating a PUSCH transmission to the UE on a PDCCH in operation S710. The downlink grant in operation S700 and the uplink grant in operation S710 may be transmitted in the same subframe n. Also, the PUSCH may be transmitted in a subsequent subframe (e.g., subframe n+4 in FDD PUCCH cell group, subframe n+k in TDD PUCCH cell group) together with HARQ-ACK information with respect to the PDCCH indicating the PDSCH. Alternatively, the PUSCH may be transmitted together with HARQ-ACK information with respect to an (E)PDCCH indicating SPS release and the PDSCH.

A T-DAI field may correspond to a T-DAI set. For example, when the T-DAI field is 2 bits, Table 2 may be used. When the T-DAI field is 3 bits, Table 3 may be used.

The eNB receives the HARQ-ACK from the UE on a PUSCH in a subsequent subframe (e.g., subframe n+4 in FDD PUCCH cell group, subframe n+k in TDD PUCCH cell group) in operation S715.

Figure 8:
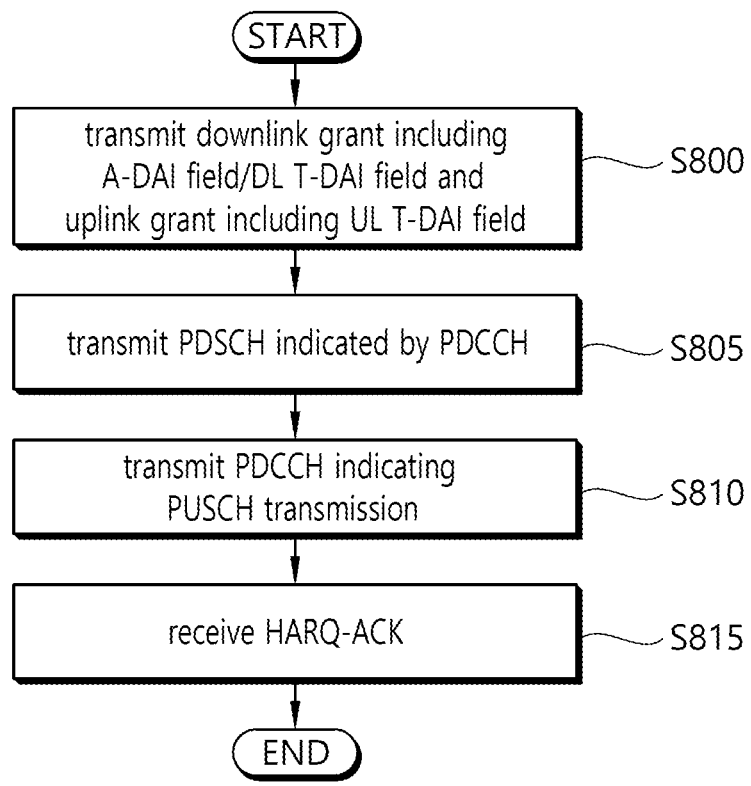
FIG. 8 is a flowchart illustrating a method for an eNB to receive a HARQ-ACK according to another example of the present disclosure.

FIG. 8 is a flowchart illustrating a method for an eNB to receive a HARQ-ACK according to another example of the present invention. This is the case in which a T-DAI field is included in both a downlink grant and an uplink grant according to Case 2.

Referring to FIG. 8, an eNB sets an A-DAI, a DL T-DAI, and a UL T-DAI, and transmits a downlink grant (including an A-DAI field indicating an A-DAI and a DL T-DAI field indicating a DL T-DAI) and an uplink grant (including an UL T-DAI field indicating UL T-DAI) to a UE on different PDCCHs or the same PDCCH in operation S800. According to Case 2, based on Options, the uplink grant may include a legacy DAI field instead of an UL T-DAI field (refer to Table 5).

Before operation S800, the eNB may transmit, to the UE, information indicating the configuration of a semi-static HARQ-ACK codebook or a dynamic HARQ-ACK codebook. The semi-static HARQ-ACK codebook configuration is a first mode that the eNB transmits, to the UE, a higher layer signaling associated with the size of a HARQ-ACK codebook. The dynamic HARQ-ACK codebook configuration is a second mode that the eNB does not transmit, to the UE, a higher layer signaling associated with the size of a HARQ-ACK codebook. In the second mode, the UE may determine a final T-DAI and the size of a HARQ-ACK codebook based on an A-DAI field, a DL T-DAI field, and a UL T-DAI field.

The eNB transmits, to the UE, a PDSCH indicated by the PDCCH in operation S805. As many PDSCHs as a value corresponding to the final T-DAI may be transmitted in the time axis (at least one subframe) or the frequency (at least one serving cell or CC) in a given bundling window.

The eNB transmits an uplink grant indicating a PUSCH transmission to the UE on a PDCCH in operation S810. The uplink grant in operation S800 and the uplink grant in operation S810 may be the same as, or different from each other. According to the former case, the downlink grant in operation S800 and the uplink grant in operation S810 may be received in the same subframe n. Also, the PUSCH may be transmitted in a subsequent subframe (e.g., subframe n+4 in FDD, subframe n+k in TDD) together with HARQ-ACK information with respect to the PDCCH indicating the PDSCH. Alternatively, the PUSCH may be transmitted together with HARQ-ACK information with respect to an (E)PDCCH indicating SPS release and the PDSCH.

A T-DAI field may correspond to a T-DAI set. For example, when the T-DAI field is 2 bits, Table 2 may be used. When the T-DAI field is 3 bits, Table 3 may be used.

The eNB receives the HARQ-ACK from the UE on a PUSCH in a subsequent subframe (e.g., subframe n+4 in FDD, subframe n+k in TDD) in operation S815.

Figure 9:
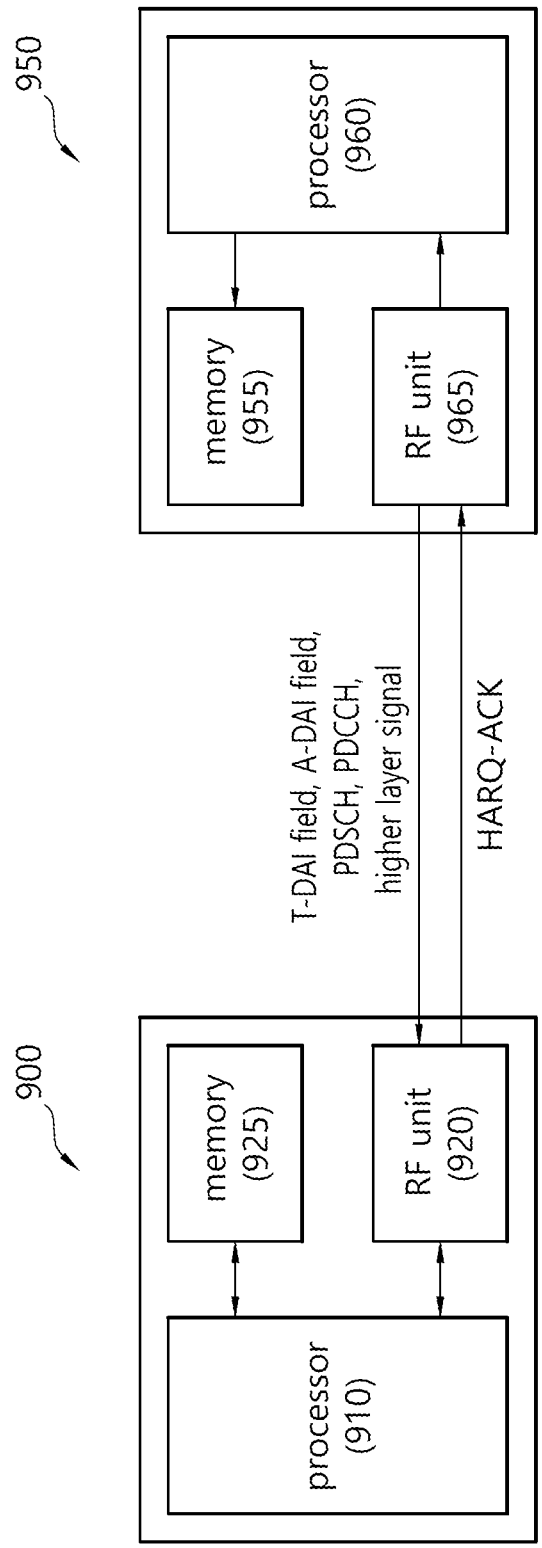
FIG. 9 is a block diagram illustrating a UE and an eNB according to an example of the present disclosure.

FIG. 9 is a block diagram illustrating a UE and an eNB according to an example of the present disclosure.

Referring to FIG. 9, a UE 900 calculates the size of HARQ-ACK codebook, generates a HARQ-ACK, and transmits the HARQ-ACK according to Case 1 and Case 2 disclosed in the present specification. Also, an eNB 950 performs operations in response to the operations of UE 900 according to Case 1 and Case 2 disclosed in the present specification.

For example, an RF circuit 920 transmits a HARQ-ACK to the eNB 950, or receives, from the eNB 950, a downlink grant including an A-DAI field and a T-DAI field, an uplink grant including a T-DAI field, or a PDSCH, PDCCH, a higher layer signaling, or the like.

Particularly, a processor 910 of the UE 900 may decode and interpret the received downlink grant, uplink grant, PDCCH, PDSCH, higher layer signaling, or the like, and may generate and transmit a HARQ-ACK based on the decoded and interpreted information.

For example, an RF circuit 965 receives a HARQ-ACK from the UE 900, or transmits, to the UE 900, an A-DAI field, a T-DAI field, a DL T-DAI field, a UL T-DAI field, a downlink grant, an uplink grant, a PDSCH, a PDCCH, a higher layer signaling, or the like.

Particularly, the processor 960 may generate an A-DAI field, a T-DAI field, a DL T-DAI field, a UL T-DAI field, a downlink grant, an uplink grant, a PDSCH, a PDCCH, or a higher layer signaling to be transmitted through the RF circuit 965.

What is claimed is:

1. A non-transitory computer-readable medium storing instructions that, when executed by one or more processors, cause a wireless user device to:

receive, from a first serving cell and via a first Physical Downlink Control Channel (PDCCH) in a first subframe, a first downlink grant comprising a first accumulated downlink assignment indicator (A-DAI) field and a first total DAI (T-DAI) field;

receive, from a second serving cell and via a second PDCCH in the first subframe, a second downlink grant comprising a second A-DAI field and a second T-DAI field;

determine a value of the first A-DAI field and a value of the first T-DAI field, wherein the value of the first T-DAI field indicates an integer T1, wherein the value of the first A-DAI field indicates an integer A smaller than or equal to the integer T1, and wherein the value of the first T-DAI field is mapped to a set including a plurality of T-DAI values;

determine a value of the second A-DAI field and a value of the second T-DAI field, wherein the value of the second T-DAI field indicates the integer T1, and wherein the value of the second A-DAI field indicates an integer B smaller than or equal to the integer T1;

receive a first PDSCH indicated by the first PDCCH and receive a second PDSCH indicated by the second PDCCH;

determine that the integer B is the highest value among values indicated by A-DAI field values determined from PDCCHs received in the first subframe;

determine one of the plurality of T-DAI values, wherein the determined one of the plurality of T-DAI values is the closest integer to the integer B;

receive an uplink grant indicating a transmission of a Physical Uplink Shared Channel (PUSCH);

determine a size of a hybrid automatic repeat request acknowledgement (HARQ-ACK) codebook to which an HARQ-ACK associated with the first PDSCH and an HARQ-ACK associated with the second PDSCH are to be mapped, wherein the size of the HARQ-ACK codebook is determined based on the determined one of the plurality of T-DAI values; and transmit, via the PUSCH, the HARQ-ACK associated with the first PDSCH and the HARQ-ACK associated with the second PDSCH.

2. The non-transitory computer-readable medium of claim 1, wherein the instructions, when executed by the one or more processors, cause the wireless user device to:

receive, from a third serving cell and via a third PDCCH in a second subframe, a third downlink grant comprising a third A-DAI field and a third T-DAI field;

receive, from a fourth serving cell and via a fourth PDCCH in the second subframe, a fourth downlink grant comprising a fourth A-DAI field and a fourth T-DAI field;

determine a value of the third A-DAI field and a value of the third T-DAI field, wherein the value of the third T-DAI field indicates an integer T2, and wherein the value of the third A-DAI field indicates an integer C larger than the integer T1 and smaller than or equal to the integer T2; and determine a value of the fourth A-DAI field and a value of the fourth T-DAI field, wherein the value of the fourth T-DAI field indicates the integer T2, and wherein the value of the fourth A-DAI field indicates an integer D larger than the integer T1 and smaller than or equal to the integer T2.

3. The non-transitory computer-readable medium of claim 2, wherein the first T-DAI field and the second T-DAI field indicate that total T1 number of downlink channels, comprising PDSCHs indicated by PDCCHs and comprising PDCCH indicating downlink semi persistent scheduling (SPS) release, are scheduled for the wireless user device in the first subframe, and wherein total T1 number of different serving cells transmit, in the first subframe, PDCCHs comprising values of A-DAI and T-DAI.

4. The non-transitory computer-readable medium of claim 3, wherein the third T-DAI field and the fourth T-DAI field indicate that total (T2−T1) number of downlink channels, comprising PDSCHs indicated by PDCCHs and comprising PDCCH indicating downlink SPS release, are scheduled for the wireless user device in the second subframe, and wherein total (T2−T1) number of different serving cells transmit, in the second subframe, PDCCHs comprising a value pair of A-DAI and T-DAI fields.

5. The non-transitory computer-readable medium of claim 4, wherein one or more downlink SPS PDSCH transmissions are excluded in determining the values of first T-DAI field, the second T-DAI field, the third T-DAI field, and the fourth T-DAI field.

6. The non-transitory computer-readable medium of claim 1, wherein the instructions, when executed by the one or more processors, cause the wireless user device to determine to increase the size of the HARQ-ACK codebook based on one or more downlink semi persistent scheduling (SPS) PDSCH transmissions.

7. A non-transitory computer-readable medium storing instructions that, when executed by one or more processors, cause a wireless user device to:

receive, from a first serving cell and via a first Physical Downlink Control Channel (PDCCH) in a first subframe, a first downlink grant comprising a first accumulated downlink assignment indicator (A-DAI) field and a first total DAI (T-DAI) field;

receive, from a second serving cell and via a second PDCCH in the first subframe, a second downlink grant comprising a second A-DAI field and a second T-DAI field;

determine a value of the first A-DAI field and a value of the first T-DAI field, wherein the value of the first T-DAI field indicates an integer T1, and wherein the value of the first A-DAI field indicates an integer A smaller than or equal to the integer T1;

determine a value of the second A-DAI field and a value of the second T-DAI field, wherein the value of the second T-DAI field indicates the integer T1, and wherein the value of the second A-DAI field indicates an integer B smaller than or equal to the integer T1;

receive a first PDSCH indicated by the first PDCCH and receive a second PDSCH indicated by the second PDCCH;

receive an uplink grant indicating a transmission of a Physical Uplink Shared Channel (PUSCH);

determine a size of a hybrid automatic repeat request acknowledgement (HARQ-ACK) codebook to which an HARQ-ACK associated with the first PDSCH and an HARQ-ACK associated with the second PDSCH are to be mapped, wherein determining the size of the HARQ-ACK comprises determining to increase the size of the HARQ-ACK codebook based on one or more downlink semi persistent scheduling (SPS) PDSCH transmissions; and transmit, via the PUSCH, the HARQ-ACK associated with the first PDSCH and the HARQ-ACK associated with the second PDSCH.

8. The non-transitory computer-readable medium of claim 7, wherein the instructions, when executed by the one or more processors, cause the wireless user device to:

receive, from a third serving cell and via a third PDCCH in a second subframe, a third downlink grant comprising a third A-DAI field and a third T-DAI field;

receive, from a fourth serving cell and via a fourth PDCCH in the second subframe, a fourth downlink grant comprising a fourth A-DAI field and a fourth T-DAI field;

determine a value of the third A-DAI field and a value of the third T-DAI field, wherein the value of the third T-DAI field indicates an integer T2, and wherein the value of the third A-DAI field indicates an integer C larger than the integer T1 and smaller than or equal to the integer T2; and determine a value of the fourth A-DAI field and a value of the fourth T-DAI field, wherein the value of the fourth T-DAI field indicates the integer T2, and wherein the value of the fourth A-DAI field indicates an integer D larger than the integer T1 and smaller than or equal to the integer T2.

9. The non-transitory computer-readable medium of claim 8, wherein the first T-DAI field and the second T-DAI field indicate that total T1 number of downlink channels, comprising PDSCHs indicated by PDCCHs and comprising PDCCH indicating downlink semi persistent scheduling (SPS) release, are scheduled for the wireless user device in the first subframe, and wherein total T1 number of different serving cells transmit, in the first subframe, PDCCHs comprising values of A-DAI and T-DAI.

10. The non-transitory computer-readable medium of claim 9, wherein the third T-DAI field and the fourth T-DAI field indicate that total (T2−T1) number of downlink channels, comprising PDSCHs indicated by PDCCHs and comprising PDCCH indicating downlink SPS release, are scheduled for the wireless user device in the second subframe, and wherein total (T2−T1) number of different serving cells transmit, in the second subframe, PDCCHs comprising a value pair of A-DAI and T-DAI fields.

11. The non-transitory computer-readable medium of claim 10, wherein one or more downlink SPS PDSCH transmissions are excluded in determining the values of first T-DAI field, the second T-DAI field, the third T-DAI field, and the fourth T-DAI field.

12. The non-transitory computer-readable medium of claim 7, wherein the value of the first T-DAI field is mapped to a set including a plurality of T-DAI values.

13. The non-transitory computer-readable medium of claim 12, wherein the instructions, when executed by the one or more processors, cause the wireless user device to:

determine that the integer B is the highest A-DAI field value among values indicated by A-DAI field values determined from PDCCHs received in the first subframe; and determine one of the plurality of T-DAI values, wherein the determined one of the plurality of T-DAI values is the closest integer to the integer B, wherein the size of the HARQ-ACK codebook is determined based on the determined one of the plurality of T-DAI values.

14. A non-transitory computer-readable medium storing instructions that, when executed by one or more processors, cause a wireless user device to:

receive, from a first serving cell and via a first Physical Downlink Control Channel (PDCCH) in a first subframe, a first downlink grant comprising a first accumulated downlink assignment indicator (A-DAI) field and a first total DAI (T-DAI) field;

receive, from a second serving cell and via a second PDCCH in the first subframe, a second downlink grant comprising a second A-DAI field and a second T-DAI field;

receive, from a third serving cell and via a third PDCCH in a second subframe, a third downlink grant comprising a third A-DAI field and a third T-DAI field;

receive, from a fourth serving cell and via a fourth PDCCH in the second subframe, a fourth downlink grant comprising a fourth A-DAI field and a fourth T-DAI field;

determine a value of the first A-DAI field and a value of the first T-DAI field, wherein the value of the first T-DAI field indicates an integer T1, and wherein the value of the first A-DAI field indicates an integer A smaller than or equal to the integer T1;

determine a value of the second A-DAI field and a value of the second T-DAI field, wherein the value of the second T-DAI field indicates the integer T1, and wherein the value of the second A-DAI field indicates an integer B smaller than or equal to the integer T1;

determine a value of the third A-DAI field and a value of the third T-DAI field, wherein the value of the third T-DAI field indicates an integer T2, and wherein the value of the third A-DAI field indicates an integer C larger than the integer T1 and smaller than or equal to the integer T2;

determine a value of the fourth A-DAI field and a value of the fourth T-DAI field, wherein the value of the fourth T-DAI field indicates the integer T2, and wherein the value of the fourth A-DAI field indicates an integer D larger than the integer T1 and smaller than or equal to the integer T2 receive a first PDSCH indicated by the first PDCCH and receive a second PDSCH indicated by the second PDCCH;

receive an uplink grant indicating a transmission of a Physical Uplink Shared Channel (PUSCH);

determine a size of a hybrid automatic repeat request acknowledgement (HARQ-ACK) codebook to which an HARQ-ACK associated with the first PDSCH and an HARQ-ACK associated with the second PDSCH are to be mapped; and transmit, via the PUSCH, the HARQ-ACK associated with the first PDSCH and the HARQ-ACK associated with the second PDSCH, wherein the first T-DAI field and the second T-DAI field indicate that total T1 number of downlink channels, comprising PDSCHs indicated by PDCCHs and comprising PDCCH indicating downlink semi persistent scheduling (SPS) release, are scheduled for the wireless user device in the first subframe, and wherein PDCCHs comprising values of A-DAI and T-DAI are transmitted, in the first subframe, from total T1 number of different serving cells.

15. The non-transitory computer-readable medium of claim 14, wherein the third T-DAI field and the fourth T-DAI field indicate that total (T2−T1) number of downlink channels, comprising PDSCHs indicated by PDCCHs and comprising PDCCH indicating downlink SPS release, are scheduled for the wireless user device in the second subframe, and wherein total (T2−T1) number of different serving cells transmit, in the second subframe, PDCCHs comprising a value pair of A-DAI and T-DAI fields.

16. The non-transitory computer-readable medium of claim 15, wherein one or more downlink SPS PDSCH transmissions are excluded in determining the values of first T-DAI field, the second T-DAI field, the third T-DAI field, and the fourth T-DAI field.

17. The non-transitory computer-readable medium of claim 14, wherein the value of the first T-DAI field is mapped to a set including a plurality of T-DAI values.

18. The non-transitory computer-readable medium of claim 17, wherein the instructions, when executed by the one or more processors, cause the wireless user device to:

determine that the integer B is the highest A-DAI field value among values indicated by A-DAI field values determined from PDCCHs received in the first subframe; and determine one of the plurality of T-DAI values, wherein the determined one of the plurality of T-DAI values is the closest integer to the integer B, wherein the size of the HARQ-ACK codebook is determined based on the determined one of the plurality of T-DAI values.

19. The non-transitory computer-readable medium of claim 14, wherein the instructions, when executed by the one or more processors, cause the wireless user device to increase the size of the HARQ-ACK codebook based on one or more downlink semi persistent scheduling (SPS) PDSCH transmissions.

* * * * *